United States Patent Office 3,050,765
Patented Aug. 28, 1962

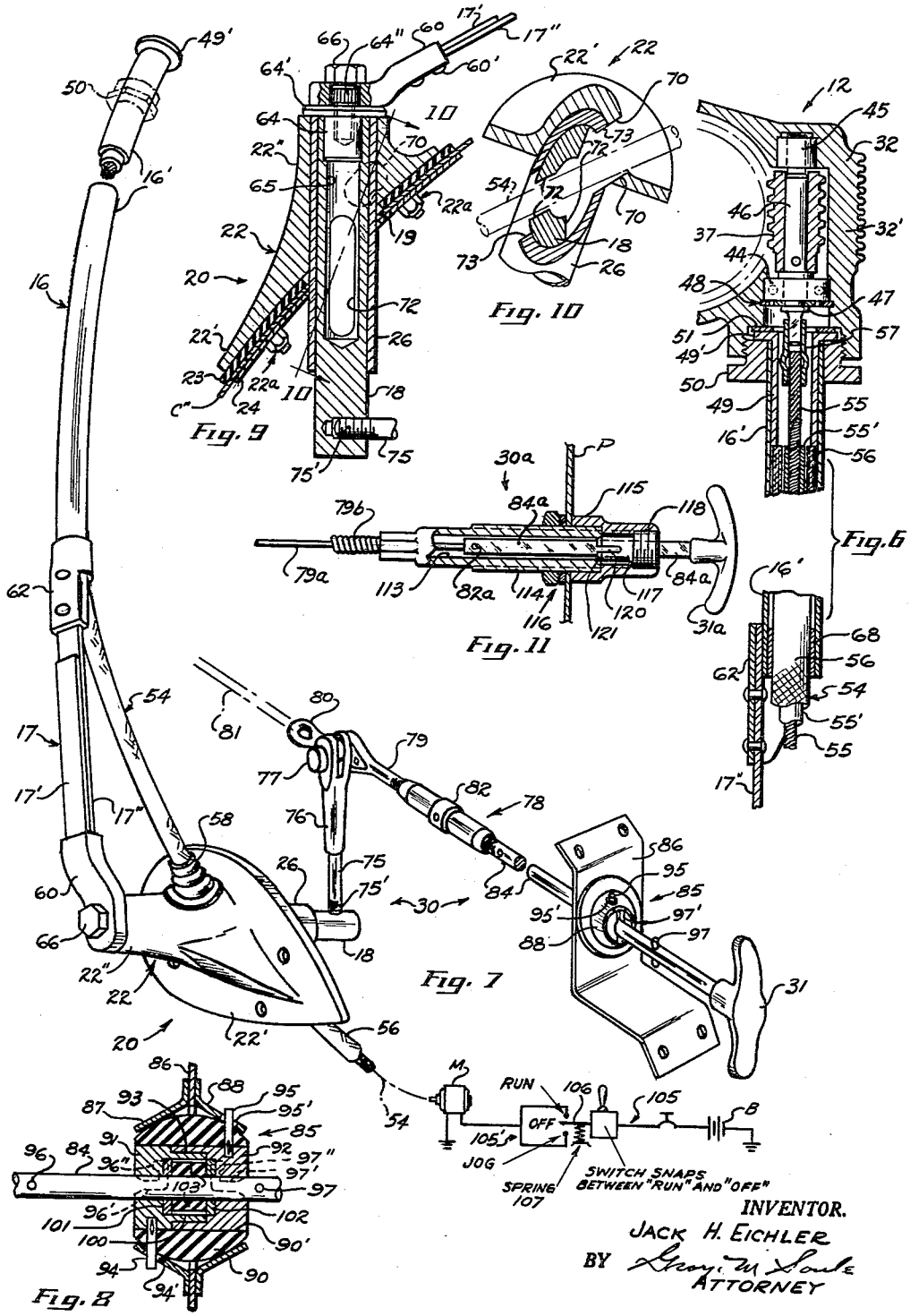

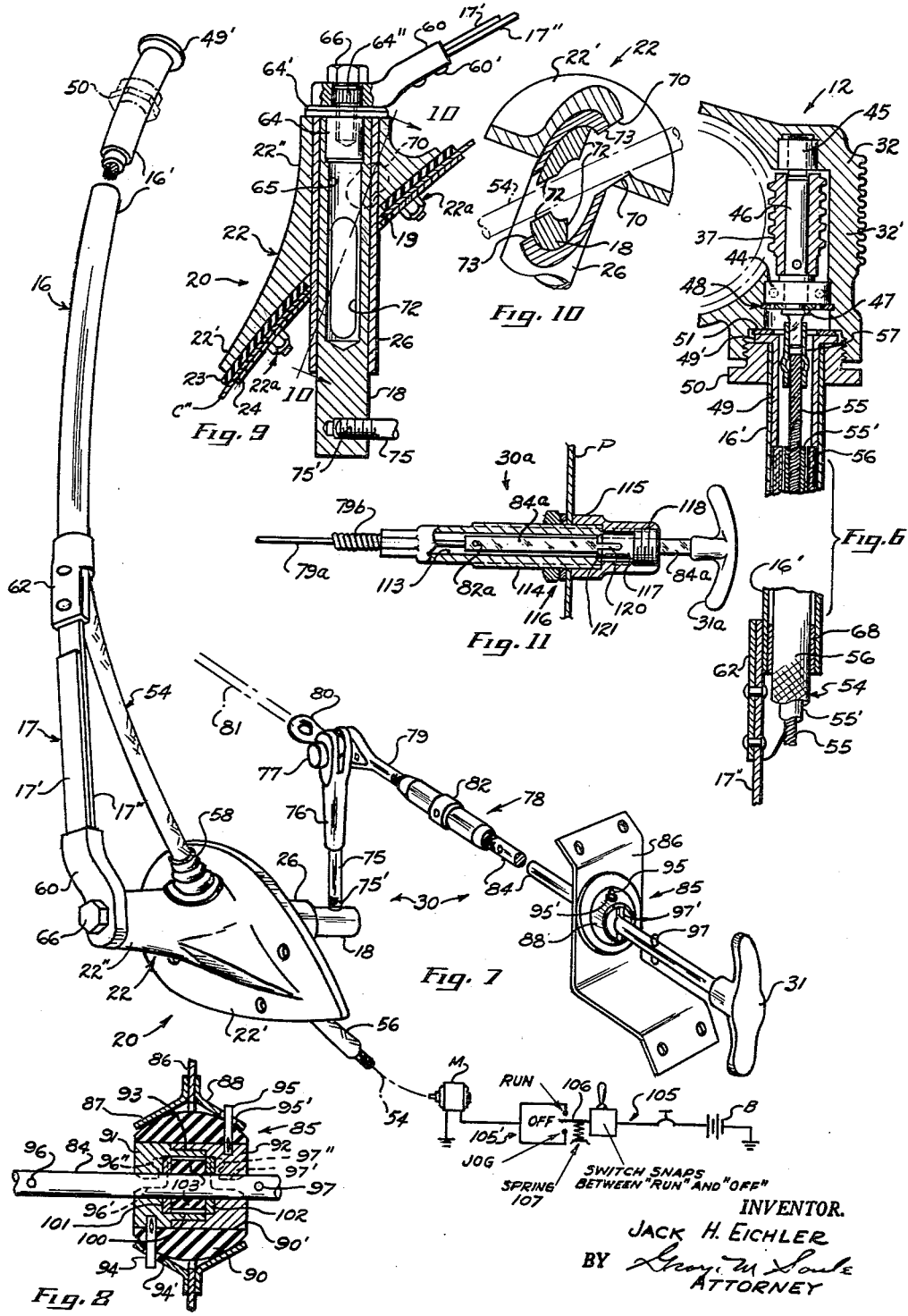

3,050,765
ROTARY WIPERS, PARTICULARLY
FOR AIRCRAFT
Jack H. Eichler, Chagrin Falls, Ohio, assignor to Curtiss-Wright Corporation, a corporation of Delaware
Filed Jan. 12, 1960, Ser. No. 2,017
7 Claims. (Cl. 15—250.22)

The particular embodiment of the invention shown herewith by way of example was designed for use on light airplanes which is to say airplanes designed for operation at less than 220 m.p.h.

A practical rotary wiper mechanism for windshields of modern or present day light airplanes must be capable of installation and effectual operation on a large variety of different designs of airplanes; the wiper blade unit or assembly must be very strongly supported while in operation against displacement by high and variable direction air load; the wiper unit must be capable of operation on surfaces of variously curved forms; the supporting means for such wiper unit must be capable of movement between operating and stowed positions of that unit, and the mechanism as a whole, including a suitable motor and connected transmission means, must have small mass and bulk and be capable of being made and installed at reasonable cost or expense.

Further, the necessary means to enable effectual movement of the wiper unit and its externally located support between operating and stowed positions by the pilot in the cockpit plus locking of the wiper unit in the two positions must take into account various designs and shapes of cockpits and navigating instrument supports, so that considerable choice of position may be had for mounting the necessary cockpit-contained manipulating and control mechanism components of the wiper installation.

The principal object of the present invention is to meet the practical installation and operational requirements of an inexpensive rotary type wiping mechanism adapted for use on aircraft and particularly light airplanes.

A more specific object is to provide a rotary aircraft wiper adapted to be driven by a D.-C. or A.-C. motor of light weight and capable of operating on already available current and through simple and inexpensive low torque capacity flexible shafting through a torque converter (e.g. worm gear reduction unit) which is inexpensive and small enough to be relatively inconspicuous when mounted directly adjacent the rotary wiper blade assembly. Thereby the converter unit will drive the wiper at high torque or adequate to overcome blade drag under adverse conditions while enabling economization in the weight, size and torque capacity of the motor and flexible shaft components. The invention also provides a unique yieldable arrangement for accomplishing wiper blade pressure or loading against the windshield while enabling the torque converter and wiper blade carried thereby to be very strongly supported in operating position and efficiently and quickly stowed; and provides a simple and efficient means for overcoming tendencies for a wiper blade unit suitable for wiping curved surfaces to be lifted off the windshield by aerodynamic forces.

While it would seem desirable from the standpoint of avoiding obstruction of the field of vision of the pilot to locate the torque converter at some position other than adjacent the axis of rotation of the wiper blade assembly, actual test practice has proven that the presently proposed wiper mechanism (having its torque converter in the region of such axis) does not actually noticeably obscure vision, since during take-off and landing the pilot's eyes are focused to infinity in order to observe runways and signals. Since he has two eyes roughly 30 inches from the wiped area, he simply looks past the torque converter unit hereof and would only be conscious of its existence if he were deliberately to change focus to examine it.

Conventional or reciprocating wiper installations must meet the problems involved in blade drag, inertia and air load, whereas while rotary or unidirectionally moving wiper installations must solve the problem of blade drag, there are no significant problems involving inertia and air load. There are no reversals of wiper motion, hence no acceleration and deceleration during steady operation; and, assuming the wiper blade is bi-symmetrical about its rotational axis, it is self-compensating for airload because when one end of the blade is moving against the air stream, the opposite end is being assisted thereby in its rotation.

The preferred torque converter, shown herewith as supported by a generally rigid pivot arm, is a more or less conventional worm and worm gear assembly having anti-friction bearings in its housing for the rotary parts and with the worm gear or its supporting shaft connected rotatably to support the wiper blade unit, hence operating at relatively low speed and high torque about an axis normal to the surface area of the windshield to be wiped. The pivot arm to which the converter assembly is rigidly secured coaxially of the high speed and low torque worm and its supporting shaft extends generally parallel to the surface area to be wiped. Blade loading against the windshield surface is accomplished by resilient means forming part of the pivot arm and reacting on the pivot shaft for the arm so as yieldably to force the converter unit towards the windshield surface while tending to force the worm gear along its working axis away from the windshield surface. The forces imposed by operation of the worm on the worm gear, incidentally, tend, less strongly to produce axial motion of the latter in the same direction. Thus if in the converter unit housing a fixed precisionally located stop is provided at the outer or forward end only of the hub of the worm gear (or a shoulder on a shaft rigid therewith) the operating forces just referred to above maintain the stop and coacting shoulder against each other and the worm and worm gear teeth during the wiping operation are thereby maintained in the proper relative position so as to operate with as nearly complete freedom from friction or binding as is possible or practicable.

Objects and advantages of the present construction not referred to or indicated above will become apparent from the following description of the preferred forms as shown in the accompanying drawings. The essential characteristics of the invention are summarized in the claims.

In the drawings:

FIG. 1 is a fragmentary somewhat diagrammatic front view of the windshield and framing portion of a typical light airplane fuselage equipped with the present rotary wiper mechanism.

FIG. 2 is a fragmentary side elevation of the windshield and adjacent regions of the cowling with the wiper unit and its pivot arm in operating position.

FIG. 3 is an enlarged or substantially full scale fragmentary sectional view taken as at line 3—3 on FIG. 1.

FIG. 4 is a fragmentary cross-sectional view of an end portion of the wiper blade assembly taken as at line 4—4 on FIG. 3.

FIG. 5 is a typical cross-sectional view showing the preferred shape for yoke or bridge members of the wiper blade assembly, taken for example at either line 5—5 or line 5a—5a on FIG. 3.

FIG. 6 is a fragmentary mainly central cross-sectional view of portions of the torque converter housing, pivot arm and flexible drive shaft, taken substantially along the line 6—6 on FIG. 3.

FIG. 7 is a largely perspective view showing constructional features of the wiper assembly pivot arm, pivot shaft, and linkage mechanism for moving the pivot arm between the wiper operating and stowed positions, the view showing diagrammatically the preferred electrical operating means for the wiper mechanism.

FIG. 8 is a fragmentary cross-sectional view of a flexible or universal type support for a main operating rod of the linkage shown generally at the right in FIG. 7.

FIG. 9 is a fragmentary cross-sectional view of the pivot arm, mounting plate and associated parts including the pivot shaft and its connection with the pivot arm of the wiper.

FIG. 10 is an oblique cross-sectional view taken approximately along the line 10—10 on FIG. 9.

FIG. 11 is a fragmentary, longitudinal cross-sectional view of a modified form of flexible manually operable positioning and locking means for the pivot arm of the wiper.

In FIGS. 1 and 2 the illustrated portions of the fuselage F including cowl portion C forwardly of the windshield or screen S will be considered as constituting suitable framework for the windshield, which framework supports the mounting parts of present wiper mechanism. Other portions of the wiper mechanism are disposed within the pilot's cockpit as will be evident from FIG. 2 wherein the cowling C is shown as extended into the cockpit as at C' for at least partial support of the instrument panel P.

Wiper Unit Construction

The wiper mechanism hereof, generally indicated I in FIGS. 1 and 2, comprises or includes wiper blade assembly or unit 2 driven by converter unit 12. The blade unit 2 is adapted for wiping curved surfaces and is preferably of the plural yoke or link type with flexible blade or squeegee as shown for example in J. W. Anderson Patent 2,596,063, dated May 6, 1952. In such construction the squeegee is supported substantially rigidly in a plane generally parallel to the windshield surface to be wiped while being highly flexible for its full length in a direction at right angles to such surface.

As shown by comparison of FIGS. 3 and 5, the main yoke or bridge member 4 (preferably of flattened oval cross-section, FIG. 5, for minimized airstream resistance or impact) supports secondary yokes or links 5 of similar cross section freely pivoted to the main yoke or bridge as on pins or rivets 6. Terminal portions 7 of the secondary yokes slidably embrace an elongated flexible metal strip 8 extending the entire length of the squeegee 9 and supporting the squeegee as will be apparent in FIG. 4. The squeegee 9, for reasons well known to persons skilled in the art, is of basically triangular shape in cross section, thus having exposed side surfaces 9' and 9" diverging away from the surface to be wiped. The yokes or links 4 and 5 form the main backing for the flexible squeegee 9 and the elongated flexible metal strip 8 forms a supplementary backing as part of the wiper assembly unit 2. The arm portions 5' (FIGS. 3 and 4) which extend beyond the ends of the yoke or beam 4 in each direction have fins 10 suitably secured thereto providing exposed surfaces 10' and 10" which converge forwardly or in the direction of flight away from the surface to be wiped. The fins 10, in all turned positions of unit 2, approximately balance airstream-imposed aerodynamic forces on the forwardly diverging surfaces 9' and 9" of the squeegee and which normally tend to lift the squeegee off the windshield. Since the end portions of the blade assembly are those most likely to be lifted by airstream forces on the squeegee, it is sufficient if the fins 10 are provided only on the supplemental yoke arm or link extensions 5' or as shown by comparison of FIGS. 3 and 4.

The saddle or blade holder 11 for main yoke or bridge member 4 has a screw portion 11' mating internal screw threads of the output shaft 15 of the torque converter unit 12. Thereby no locking means is required for the blade unit or assembly on the drive shaft (shaft rotates unidirectionally); and replacement of blade units, when necessary, is facilitated as will be evident.

Mechanism I (General)

The torque converter unit 12 (FIGS. 3 and 6), described later, is supported by an approximately stiff and preferably curved tubular outer end portion or member 16' of the pivot arm 16 which has a flexible or blade loading spring portion 17 secured to the pivot shaft 18 of the mounting assembly 20 and as best shown in FIGS. 7, 9 and 10. The main portion of the mounting assembly is a tubular mounting plate or bracket 22 whose generally streamlined base or flange portion 22' is secured as shown principally by FIG. 9 (cf. FIGS. 1 and 2) so that a portion of the pivot shaft 18 extends through a suitable opening 19 in the ship's skin or cowling forming the windshield framework to within the cockpit for manipulation by the pilot. This enables the pivot arm and wiper unit 2 to be selectively positioned between the operating position as shown in full lines FIGS. 1 and 2 and stowed position as shown in broken lines in FIG. 1. The flange portion 22' of the mounting bracket is secured as by a screw and bolt assembly 22a (FIG. 9) against a sealing gasket 23 around the opening 19 in the ship's skin as will be evident from FIG. 9. The portion of the ship's skin C" shown in that view lies between a mounting plate gasket 23 and a metal doubler plate 24. The pivot shaft is journalled for angular movement in a bushing 26 rigidly secured in the tubular portion 22" of the mounting bracket by suitable means not shown (e.g. press fit).

The pivot-arm-manipulating linkage 30, FIG. 7 (or 30a, FIG. 11)—both described later—is operatingly connected to the pivot shaft 18—e.g. as more or less apparent from inspection of FIG. 7. Handle 31 (or 31a) of the manipulating linkage is disposed within easy reach of the pilot and may have to occupy various selected positions depending upon available space and the arrangement or design of the instrument board and associated parts or framework of the cockpit.

Torque Converter Unit 12

The housing 32 for unit 12 is made in two parts 32' and 32" secured together at a labyrinth joint 33 by a suitable means not shown. As will be evident from FIG. 3 the parts 32' and 32" are machined to receive respectively sealed type ball bearings assemblies 34 and 35 on opposite sides or ends of the converter output element shown as a worm gear 36 meshing with worm 37 or the input element of the converter unit. The output shaft 15 of the unit is fixed to the hub portion 38 of the worm wheel 36 as by a pin 39 entering a reduced diameter portion 40 of the shaft and which projects into the bearing assembly 34. Shoulder 38' on the worm gear hub has a very close tolerance relationship to the principal central plane of the worm wheel generally (along line 6—6) and the only other portion of the assembly requiring precisional location axially of the output shaft 15 is an annular abutment 42 for cooperation with the shoulder 38'. Abutment 42 as shown is formed on a hardened annular distance piece or washer 43 lying against the inner race member of bearing assembly 34. The distance to be maintained with the high degree of accuracy is from the seat 34' for the outer race of the bearing assembly 34 to the abutment surface 42 for the gear hub. At the opposite end of the hub 38 no close tolerances in axial dimensions have to be maintained as to any of the illustrated parts. As earlier pointed out, during operation of the wiper mechanism, the worm-wheel-driving and wiper-blade-loading forces work together in maintaining the cooperating abutment surfaces 38' and 42 in mutual contact.

The input portion of the converter unit 12 (see FIG. 6) includes bearings 44 and 45 for the worm shaft 46, which may be similar to bearing assemblies 34 and 35 as described in connection with FIG. 3. Bearing 44 and the non-circular torque receiving end portion 47 of the worm shaft 46 may be held axially in proper working position by a pair of snap rings 48 in grooves formed in shaft 47 and housing portion 32'. A flanged sleeve 49 is tight in the rigid pivot arm portion or tube 16' as shown in the upper part of FIG. 6, and the tube 16' is held in proper operating relationship to the converter housing by a clamping nut 50 loosely supported on the tube 16' and which presses the flange portion 49' of the sleeve 49 against a lock washer 51 seated in the housing as clearly shown.

The conventionally sheathed flexible drive shaft assembly (generally indicated 54) includes, as shown, a cable or core 55 of usual construction and inner and outer flexible sheath portions or parts 55' and 56. The latter is usually made of braided or interwoven metal strips. The inner sheath 55' is relatively tough plastic material on the order of nylon. A conventional coupling sleeve 57 between the core or cable 55 and the torque receiving portion 47 of the worm shaft is essentially duplicated at the opposite or driving-motor-associated end (not shown) of the flexible shaft assembly 54. As will be evident from comparison of FIGS. 6, 7 and 9, the flexible shaft assembly 54 extends out of the inner (lower as shown) end of the tube 16' and thence through openings in the mounting plate and pivot shaft assembly. A weather-element-excluding boot 58, FIG. 7 only, is cemented or otherwise suitably attached both to the armor case 56 and to the mounting bracket 22 around an opening therein which receives the flexible shaft assembly as will be further described in reference to FIGS. 9 and 10.

The flexible portion 17 of the pivot arm 16 comprises, as shown, two leaf springs 17' and 17". Both leaf springs are rigidly secured to a head or head piece 60 of the pivot arm assembly as by rivets 60' FIG. 9; and one of the leaf springs, 17" as shown, is secured rigidly to the inner or lower end of the tube 16' of the pivot arm as in a sheet metal clip 62 having portions embracing and secured to the tube 16' by suitable means. Provision for some angular adjustment between the pivot shaft 18 and the head 16 or as a suitable mounting connection between the pivot arm and pivot shaft comprises a flanged sleeve or stud 64 tight (as by press fitting) in a counterbore portion of a socket 65 in the pivot shaft 18. The flanged portion 64' of the sleeve or stud 64 forms a support for the head piece 60 and a reduced diameter serrated portion 64" of the sleeve or stud mates complementary serrations in headpiece 60. The latter is clamped against the flange 64' by a cap screw 66 suitably threaded into the sleeve or stud 64.

Referring to the lower part of FIG. 6, the portion of the flexible shaft assembly 54 which lies within the pivot arm tube 16' is held with its cable coupling 57 in proper relationship to the worm shaft extension 47 via abutment between the upper end portion of the sheath assembly 55', 56 and the sleeve portion 49 of tube 16'. During assembly the metal sheath 56 is fixed to the tube 16' as by a soldered-in sleeve 68 disposed between the metal sheath and the inner wall of the tube 16'.

A flexible shaft assembly such as shown becomes inefficient in proportion to the amount the assembly is flexed as about too short a radius for effectual operation. The problem of weather sealing the flexible shaft assembly (partly done by the boot 58 FIG. 7) and getting the assembly to enter the cockpit through the same opening (19) in the ship's skin through which the pivot shaft 18 passes, while minimizing local flexure of the flexible shaft assembly, is solved by providing a circumferentially elongated opening or slot 70, FIGS. 9 and 10, in the tubular wall of the mounting plate or bracket 22 and additional suitably obliquely offset openings through the pivot shaft 18 and its bushing 26. As more or less diagrammatically shown by comparison of FIGS. 9 and 10, elongated openings 72 in the pivot shaft 18 communicate with openings 73 and 74 in the bushing 26 (shown only in FIG. 10). When the wiper unit 2 and pivot arm 16 are swung between the operating and stowed positions of the wiper unit, the flexure required of the portion of the flexible shaft which extends through the mounting plate assembly 20 is only a few degrees or within easy capability of the flexible shaft assembly to withstand the flexure without deterioration and with negligible power loss.

Referring further to the manipulating linkage 30 of FIG. 7 a lever arm, shown as a rod 75 threaded at 75' into the pivot shaft carries an eye 76 at its outer end suitably coupled as by a pin 77 with an operating rod assembly 78 at a terminal part 79 of such assembly. The rod 75 or the eye 76, during assembly, are left loose enough at their threads to enable the rod to turn freely about the axis of the rod for enabling selection of position of the operating mechanism 30 and its necessary supporting means. The eye 76 is bifurcated to receive a shackle 80 for attachment of one end of an elastic cord or bungee 81 which may be attached at its other end to the fuselage. The elastic cord assists the pilot in moving the wiper unit to stowed position and serves as a counterbalance for upward forces exerted aerodynamically on the wiper unit and pivot arm during flight. The operating rod assembly 78 further includes a turnbuckle 82 and a forward rod section 84 one end of which constitutes part of the turnbuckle and the opposite end of which is freely turnable on its axis and extends through a supporting and locking assembly 85 (see FIG. 8) to the handle 31. Assembly 85 includes a sheet metal bracket 86 having suitable openings or other devices enabling it to be fastened for example to the instrument board of the airplane or other suitable fixture in the cockpit.

As shown particularly in FIG. 8 the bracket 86 has complementary frusto conical socket-forming members 87 and 88 secured thereto for a universal or ball type pivot block 90 preferably of high durameter plastic. Block 90 has a bore 90' coaxial with the rod 84 and mutually complementary relatively telescoping metal sleeve members 91 and 92 (e.g. pressed together at region 93) surround the rod 84 and form a bearing for it through which it can slide and turn. The block 90 and sleeve assembly 91 and 92 rigid therewith has only limited capability of turning in the socket members 87, 88 by reason of pins 94 and 95 in the assembly which project loosely through receiving openings 94' and 95' therefor in the members 88 and 88'. The turnbuckle 82 and its connected rods 74 and 89 are conventionally wired together through cross holes in the parts (wire not shown) so as to constitute a limited swivel mounting for the operating rod 84. Cross pins 96 and 97 on the operating rod 84 and cooperating bayonet lock devices (described below) in the universal support assembly 90, 91, 92 enable the pivot pin 18 of pivot arm 16 to be swung as necessary and locked into the required positions for operation and stowing of the wiper unit.

As shown in FIG. 8, mainly by dotted lines, cross pin 96 can enter J-shaped locking slots 96' (one of a pair of slots being shown), and similarly the cross pin 97 can cooperate with J-shaped slots 97' the slots being formed respectively in the sleeves 91 and 92. The sleeves are oppositely and interiorly counterbored to form a cylindrical recess 100 the axial ends of which lie between the sides of respective "arm" portions of each of the J-shaped slots. Axially slidable circular plates 101 and 102 occupy the ends of the cylindrical chamber or recess 100 in position to be abutted by the respective cross pins 96 and 97 when those cross pins are moved into the J-shaped slots or bottom therein at the "arm" portions of the slots. A resilient ring 103 of suitably highly elastic material around the operating rod 84 constitutes in effect a spring normally opposing movement of both plates 101 and 102 out of their illustrated positions. Thereby the cross pins 97 and 98 are yieldably retained in the end portions 96" and 97" of the J-shaped slots. The functions of the turn-limiting pins 94 and 95 in their openings 94' and 95' will now be evident, since if the ball and sleeve assembly 90, 91, 92 were to be permitted to turn freely it would sometimes be impossible to move the cross pins into the "arm" portions of the slots by turning the handle 31 because of bodily rotation of said assembly.

In FIG. 2 the position of the control mechanism 30 is shown as though operation of handle 31 toward the pilot moved the pivot arm 16 toward stowed position. For reasons indicated above, such an installation is not the preferred one.

Driving and Control Mechanism

Motor M, FIG. 7, is energized from a suitable electrical source B in circuit 105 when the switch contact or arm member 106 is moved to its upper snapped position indicated "run"; and the motor is deenergized when the switch arm 106 is moved to its "off" position. The circuit has a loop or shunt portion 105′ containing contacts indicated "run" and "jog." When the pilot operates the switch from "run" to "off" position if the wiper blade unit 2 does not come to rest in a favorable position for stowing then the switch handle is operated by the pilot as a push button against the force of a return or biasing spring 107 into the "jog" position until the desired stowing position of the wiper blade unit has been reached. The biasing spring 107 returns the switch arm 106 automatically to "off" position after each "jogging" operation of the motor M.

Alternate Mechanical Control 30a

Referring to FIG. 11 a flexible metal push-pull rod 79a in a flexible sheath 79b (together with suitable mountings) corresponds in operative effect to the operating rod assembly 78 of FIG. 7. The push-pull rod 79a (which operates the pivot shaft 18 through suitable connections) is swivel-connected at 82a (connection not shown) to a non-circular (e.g. square) rigid operating rod or shaft portion 84a of handle 31a. Rod portion 84a can turn freely in a bore 113 of a tubular mounting case member 114 to which sheath 79b is fixed. The case member 114 is installed in suitable position on, for example, the instrument panel P of the airplane by a threaded thimble 115 and locknut assembly 116.

An axially movable collet type locking sleeve 117 has a permanently loose screw thread connection 118 with the thimble 115 and the square or non-circular shaft portion 84a of handle 31a is complementary in cross section to an axial opening (not shown) in the collet sleeve 117. The collet sleeve has clamping jaws formed as by slots 120, one shown and a conical end surface adapted to be wedged or cammed against a bevel surface portion 121 of the case 114 when the handle 31a is turned in one direction thereby to grip the rod or shaft 84a. When the handle is turned in the opposite direction, the grip is released. Such alternative mechanism 30a enables movement of the wiper blade unit 2 between its operating and stowed positions and enables releasable locking of the unit in each position, the same as accomplished by the previously described linkage arrangement 30. Suitable stops are preferably formed on or carried by the handle 31a and rod or shaft 84a appropriate to operating and stowed positioning of the wiper unit.

I claim:

1. A rotary wiper mechanism for an aircraft windshield having a framework forming part of the cockpit, said mechanism comprising an elongated wiper blade unit adapted for rotation about an axis normal to its longitudinal axis and to the surface of the windshield to be wiped, a generally rigid supporting arm for the blade unit, an angularly movable pivot member connected to an inner or pivot end portion of the arm and projecting through an opening in the windshield framework and adapted for manipulation by a person rearwardly of the windshield or within the cockpit to enable movements of the blade unit between operating and stowed positions, a torque converter unit carried by the outer or free end portion of the arm adjacent the wiper unit and having a rotary low speed, high torque output member connected to drive the wiper unit, the converter having a rotary high speed, low torque input member, a motor having a rotary output element, and flexible torque transmitting means connecting the output element of the motor with the input member of the torque converter.

2. The mechanism according to claim 1, wherein the free end portion of the supporting arm comprises a substantially rigid tube through which a portion of the flexible torque transmitting means extends, and spring means reacting on the pivot member and connected to the tube and acting thereon in a direction to urge the wiper unit toward the windshield.

3. A rotary wiper mechanism for an aircraft windshield having a framework forming part of the cockpit, said mechanism comprising an elongated wiper blade unit adapted for rotation about an axis normal to its longitudinal axis and to the surface of the windshield to be wiped, a generally rigid supporting arm for the blade unit, an angularly movable pivot member connected to an inner or pivot end portion of the arm and projecting through an opening in the windshield framework and adapted for manipulation by a person rearwardly of the windshield or within the cockpit to enable movements of the blade unit between operating and stowed positions, a motor rearwardly of the windshield and having a rotary output element, a torque converter unit carried by the outer or free end portion of the supporting arm adjacent the wiper unit and having a rotary low speed, high torque output member connected to drive the wiper unit, the converter having a rotary high speed, low torque input member, and flexible torque transmitting means extending through said opening in the windshield framework and connecting the output element of the motor with the input member of the torque converter.

4. A rotary wiper mechanism for a windshield having a framework, said mechanism comprising an elongated wiper blade unit adapted to turn about an axis normal to its longitudinal axis and to the surface area of the windshield to be wiped, a mounting bracket secured to the windshield framework around an opening therethrough, a pivot shaft supported for angular movement in the mounting bracket and extending through said opening, a supporting arm for the wiper blade unit having one end secured to the outer end of the pivot shaft and having a free end portion, the arm including spring means reacting on the pivot shaft in a direction to urge the free end portion of the arm toward the windshield, a torque converter unit comprising a housing rigid with the free end portion of the arm, a worm wheel journalled in the housing on said turning axis of the wiper blade unit and connected to drive the wiper blade unit, a cooperating worm journalled in the housing on an axis at right angles to the rotational axis of the worm wheel, means rearwardly of the windshield connected to the pivot shaft and capable of operation to swing said supporting arm into two positions appropriate to wiping and stowed positions of the wiper unit, a motor having a rotary output element, and a flexible shaft having one end connected to said element and having its other end connected to drive the worm.

5. The mechanism according to claim 4, wherein the worm wheel is mounted in the housing for limited axial movement relative to the housing, an annular shoulder in precisely fixed position in the housing operatingly abutting the worm wheel axially of it in a direction to limit and prevent movement of the worm wheel away from the windshield out of free meshing relationship with the worm, said spring means and the windshield surface cooperating to maintain the worm wheel and shoulder in abutment during wiping operations.

6. A rotary wiper mechanism for a windshield having a framework, said mechanism comprising an elongated wiper blade unit adapted to turn about an axis normal to its longitudinal axis and to the surface area of the windshield to be wiped, a mounting bracket secured to the windshield framework around an opening therethrough, a pivot shaft supported for angular movement in the mounting bracket and extending through said opening, a supporting arm for the wiper blade unit having one end flexibly secured to the outer end of the pivot shaft and having a rigid tubular portion of considerable length forming a free end portion of the arm, a torque converter unit carried by said free end portion of the arm and having a low speed, high torque output member connected to drive the wiper blade unit about said axis and a high speed, low torque input member coaxial with the tubular portion of the supporting arm, means rearwardly of the windshield connected to the pivot shaft and capable of operation to swing the supporting arm and lock it into two positions appropriate to wiping and stowed positions of the wiper unit, a motor rearwardly of the windshield and having a rotary output element, and a flexible shaft driven by said element, a portion of the flexible shaft extending through the tubular portion of the supporting arm and being connected to drive the input member of the converter.

7. A rotary wiper mechanism, for an aircraft windshield having a framework forming part of the cockpit, said mechanism comprising an elongated wiper blade unit adapted for rotation about an axis normal to the surface of the windshield to be wiped, a generally rigid supporting arm for the blade unit, a tubular mounting bracket on the framework around an opening therethrough, an angularly movable pivot shaft journaled in the bracket and connected to an inner or pivoted end portion of the arm and projecting through said opening in the windshield framework and adapted to manipulation by a person within the cockpit to enable movement of the blade unit between operating and stowed positions, a motor rearwardly of the windshield and having a rotary output shaft, a torque converter unit carried by the outer or free end portion of the arm adjacent the wiper unit and having a rotary low speed, high torque output shaft connected to drive the wiper unit, the converter having a rotary high speed, low torque input shaft, a flexible torque transmitting cable and sheath therefor extending through an opening in a tubular wall portion of the mounting bracket, through a transverse opening in the pivot shaft and thence through said opening in the windshield framework, the cable connecting the output shaft of the motor with the input shaft of the torque converter.

References Cited in the file of this patent

UNITED STATES PATENTS

| | | |
|---|---|---|
| 1,725,258 | Doner | Aug. 20, 1929 |
| 2,376,011 | Sacchini | May 15, 1945 |
| 2,607,066 | Morton | Aug. 19, 1952 |
| 2,795,004 | Bowen | June 11, 1957 |
| 2,844,839 | Krohm | July 29, 1958 |
| 2,918,690 | Krohm | Dec. 29, 1959 |
| 2,936,477 | Feller | May 17, 1960 |

FOREIGN PATENTS

| | | |
|---|---|---|
| 568,199 | Great Britain | Mar. 22, 1945 |